(12) United States Patent
Kimura et al.

(10) Patent No.: US 10,977,193 B2
(45) Date of Patent: Apr. 13, 2021

(54) REMOTE DIRECT MEMORY OPERATIONS (RDMOS) FOR TRANSACTIONAL PROCESSING SYSTEMS

(71) Applicant: Oracle International Corporation, Redwood Shores, CA (US)

(72) Inventors: Hideaki Kimura, Palo Alto, CA (US); Garret F. Swart, Palo Alto, CA (US); Spyros Blanas, Redwood Shores, CA (US)

(73) Assignee: ORACLE INTERNATIONAL CORPORATION, Redwood Shores (CA)

( * ) Notice: Subject to any disclaimer, the term of this patent is extended or adjusted under 35 U.S.C. 154(b) by 0 days.

(21) Appl. No.: 16/542,222

(22) Filed: Aug. 15, 2019

(65) Prior Publication Data

US 2020/0057731 A1   Feb. 20, 2020

Related U.S. Application Data

(60) Provisional application No. 62/719,463, filed on Aug. 17, 2018, provisional application No. 62/792,611, filed on Jan. 15, 2019.

(51) Int. Cl.
*G06F 13/00*  (2006.01)
*G06F 12/1081*  (2016.01)
*G06F 16/23*  (2019.01)

(52) U.S. Cl.
CPC ...... *G06F 12/1081* (2013.01); *G06F 16/2379* (2019.01); *G06F 2212/621* (2013.01)

(58) Field of Classification Search
CPC ............. G06F 11/2023; G06F 12/1081; G06F 16/2379; G06F 2212/621; G06F 9/5016; G06F 9/547
See application file for complete search history.

(56) References Cited

U.S. PATENT DOCUMENTS

| 8,145,838 | B1 | 3/2012 | Miller et al. |
| 8,327,186 | B2 | 12/2012 | Coatney |
| 8,527,661 | B1 | 9/2013 | Lee et al. |
| 8,539,109 | B1 | 9/2013 | Lee et al. |

(Continued)

OTHER PUBLICATIONS

Wang et al., "C-Hint: An Effective and Reliable Cache Management for RDMA-Accelerated Key-Value Stores", SOCC '14, Nov. 3-5, 2014, Seattle, WA, USA, 13 pages.

(Continued)

*Primary Examiner* — Yong J Choe
(74) *Attorney, Agent, or Firm* — Hickman Becker Bingham Ledesma LLP

(57) ABSTRACT

Techniques are described for offloading remote direct memory operations (RDMOs) to "execution candidates". The execution candidates may be any hardware capable of performing the offloaded operation. Thus, the execution candidates may be network interface controllers, specialized co-processors, FPGAs, etc. The execution candidates may be on a machine that is remote from the processor that is offloading the operation, or may be on the same machine as the processor that is offloading the operation. Details for certain specific RDMOs, which are particularly useful in online transaction processing (OLTP) and hybrid transactional/analytical (HTAP) workloads, are provided.

18 Claims, 6 Drawing Sheets

(56) References Cited

U.S. PATENT DOCUMENTS

| | | |
|---|---|---|
| 9,164,702 B1 | 10/2015 | Nesbit et al. |
| 9,836,368 B2 | 12/2017 | Keremane |
| 10,353,734 B2 | 7/2019 | Busaba |
| 10,599,435 B2 | 3/2020 | Greiner |
| 2004/0268177 A1 | 12/2004 | Ji et al. |
| 2016/0132411 A1 | 5/2016 | Jolad et al. |
| 2016/0147627 A1 | 5/2016 | Hass |
| 2017/0192863 A1 | 7/2017 | Eluri |
| 2018/0232334 A1* | 8/2018 | Oved .................. G06F 13/4278 |
| 2019/0065401 A1 | 2/2019 | Dormitzer |
| 2020/0042489 A1 | 2/2020 | Lahiri |

OTHER PUBLICATIONS

Li et al., "KV-Direct: High-Performance In-Memory Key-Value Store with Programmable NIC", SOSP '17, dated Oct. 28, 2017, Shanghai, China, 16 pages.

Lahiri, U.S. Appl. No. 16/055,978, filed Aug. 6, 2018, Final Office Action dated Nov. 12, 2020.

* cited by examiner

REMOTE DIRECT MEMORY OPERATIONS (RDMOS) FOR TRANSACTIONAL PROCESSING SYSTEMS

CROSS-REFERENCE TO RELATED APPLICATIONS; BENEFIT CLAIM

This application claims the benefit, under 35 U.S.C. § 119(e), of:
Provisional Appln. 62/719,463, filed Aug. 17, 2018, and
Provisional Appln. 62/792,611, filed Jan. 15, 2019, and
the entire contents of each of which are hereby incorporated by reference as if fully set forth herein. This application is related to U.S. patent application Ser. No. 16/055,978, filed Aug. 6, 2018, the contents of which are incorporated herein by this reference.

FIELD OF THE INVENTION

The present invention relates to remote direct memory operations.

BACKGROUND

One way to improve the availability of a service is to design the service in such a way that it continues to function properly even when one or more of its components fails. For example, U.S. patent application Ser. No. 15/606,322, filed May 26, 2017 (which is incorporated herein by this reference) describes techniques for enabling a requesting entity to retrieve data that is managed by a database server instance, from the volatile memory of a remote server machine that is executing the database server instance, without involving the database server instance in the retrieval operation.

Because the retrieval does not involve the database server instance, the retrieval operation may succeed even when the database server instance (or the operating system of the host server machine itself) has stalled or become unresponsive. In addition to increasing availability, direct retrieval of data will often be faster and more efficient than retrieval of the same information through conventional interaction with the database server instance.

Using an RDMA technique, to retrieve "target data" specified in a database command from a remote machine without involving the remote database server instance, the requesting entity first uses Remote Direct Memory Access (RDMA) to access information about where the target data resides in the server machine. Based on such target location information, the requesting entity uses RDMA to retrieve the target data from the host server machine without involving the database server instance. The RDMA reads (data retrieval operations) issued by the requesting entity are unilateral operations and do not require CPU interruption or OS kernel involvement on the host server machine (RDBMS server). Such RDMA operations may be handled, for example, by hardware on the Network Interface Controller (NIC) of the remote device.

RDMA techniques work well for operations that simply involve the retrieval of data from volatile memory of a crashed server machine. However, it is desirable to provide high availability even when the failed component is responsible for performing an operation that is more sophisticated than a mere memory access. To address this need, some systems provide a limited set of "verbs" for performing remote operations via the Network Interface Controller, such as memory accesses and atomic operations (test and set, compare and swap). These operations can complete as long as the system is powered up and the NIC has access to the host memory. However, the type of operations that they support is limited.

More sophisticated operations on data that reside in the memory of a remote machine are typically performed by making remote procedure calls (RPCs) to applications running on the remote machine. For example, a database client that desires the average of a set of numbers that is stored in a database may make an RPC to the remote database server instance that manages the database. In response to the RPC, the remote database server instance reads the set of numbers, calculates the average, and sends the average back to the database client.

In this example, if the remote database server fails, the average-computing operation fails. However, it may be possible to use RDMA to retrieve from the remote server each number in the set. Once each number in the set of numbers is retrieved by the requesting entity, the requesting entity may perform the average-computing operation. However, using RDMA to retrieve each number in the set, and then performing the calculation locally, is far less efficient than having the application on the remote server retrieve the data and perform the average-computing operation.

Despite the impressive bandwidth of modern networks, the round-trip latency in an RDMA-capable data center stubbornly remains a little over 1 microsecond. Thus, improvements to latency are falling behind improvements to network bandwidth. The widening gap, between (a) the improvement in bandwidth and (b) the improvement in latency, exposes a "network wall" to data-intensive applications. Hardware techniques, including simultaneous multi-threading, prefetching, speculative loading, transactional memory and configurable coherence domains, are not effective for hiding the fact that an access to remote memory has 10× higher latency than accessing local memory.

This network wall poses a design challenge for database systems running transactional workloads. Scaling is challenging because remote manipulations of the simplest data structures require multiple round-trips in the network. The essence of the problem is that the end-to-end latency of a sequence of operations to remote memory in a "lock, write, unlock" or lock-free "fetch-and-add, then write" pattern is in the 10 us range.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
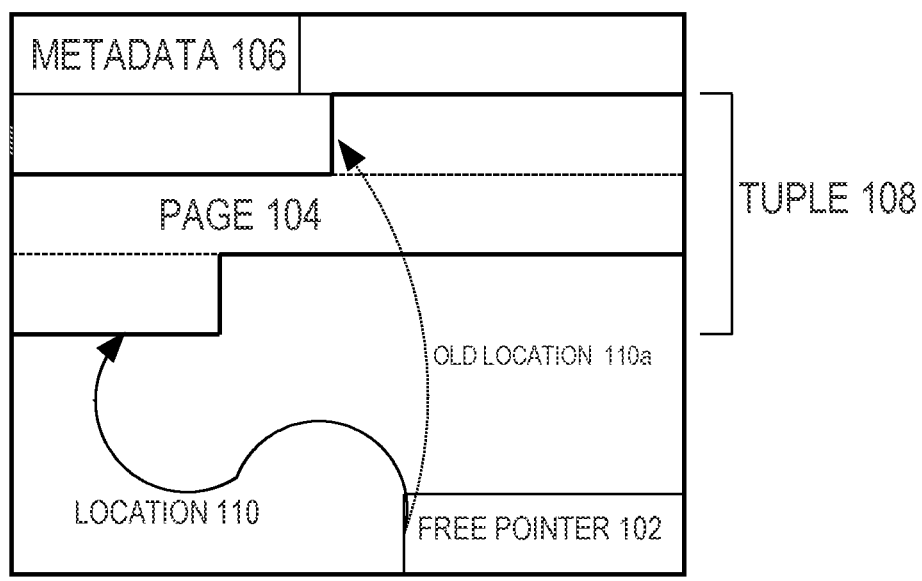
FIG. 1 is an example of SlottedAppend RDMO in an OLTP workload modifying a free pointer and then writing to the slot.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

RDMOS

Database systems can scale this network wall for on-line transaction processing (OLTP) and hybrid transactional/analytical (HTAP) workloads through novel software/hardware co-design techniques that hide microsecond long remote memory latency in a data center. As described hereafter, the network wall is scaled by grouping data processing logic in one logical "unit" that can be dispatched to the remote node and executed in one round-trip. This unit of computation is referred to herein as a Remote Direct Memory Operation, or an "RDMO".

Unlike RDMAs, which typically involve trivially simple operations such as the retrieval of a single value from the memory of a remote machine, RDMOs may be arbitrarily complex. For example, an RDMO may cause a remote machine to compute the average of a set of numbers, where the numbers reside in the memory of the remote machine. As another example, an RDMO may be a short sequence of reads, writes and atomic memory operations that will be transmitted and executed at the remote node without interrupting the remote CPU, similar to an RDMA Read or RDMA Write operation.

Using RDMOs, simple computations can be offloaded to remote network interface controllers (NICs) to improve the efficiency of the system. However, RDMOs pose a number of problems regarding the reliability of the system, especially as it pertains to data corruption. Corruption may be intentional, such as if RDMA authentication keys are sniffed on the wire while an RDMA transfer occurs for reuse by malicious actors. Corruption may also be benign, such as when a bit flip occurs in high-density memory that is directly exposed through RDMA. The non-volatile nature of NVRAM makes it particularly susceptible to this form of benign corruption.

The efficiency and reliability challenges are a roadblock towards the deployment of scalable and robust database systems for mission-critical use. A reliable and efficient mechanism is provided for transaction processing systems. According to one embodiment, transaction processing is made more efficient and scalable by encoding common sequences of operations as RDMOs. Reliability is improved through encrypted RDMA when data is in transit and fault-cognizant RDMA when data is at rest in DRAM and NVRAM.

Addressing the efficiency and reliability concerns permits multi-tenant and cloud deployments of RDMA-capable transaction processing systems. These research advances are crucial to make enterprise-quality transaction processing a reality.

Same-Machine RDMOS

The entities that are capable of executing a particular operation are referred to herein as the "execution candidates" for the operation. As explained above, RDMOS may be used to offload operations to a remote execution candidate, such the NIC of a remote host machine. In addition, RDMOS may be used to offload operations to execution candidates that are within the same machine that is executing the process that is offloading the operation.

For example, a process that is executing on the main CPU of a computing device may offload an operation to a NIC of that same computing device. A local NIC is merely one example of the types of execution candidates that may be available on a computing device.

In the case where an operation, such as a RDMO, is a relatively simple operation with high I/O and low computational requirements, it is possible that the operation may be performed more efficiently by an execution candidate running in an auxiliary processor than by an application running on a local processor. Thus, it may be desirable to have the auxiliary processor implemented on a field programmable gate array FPGA configured with logic to perform the relatively simple operation. On the other hand, if an operation, such as a RDMO, is a relatively complex operation with low I/O and high computational requirements, it may be more efficient for an application running on the local processor to be used to execute the operation.

Handling Locally-Initiated RDMOS Using an FPGA

Figure 6:
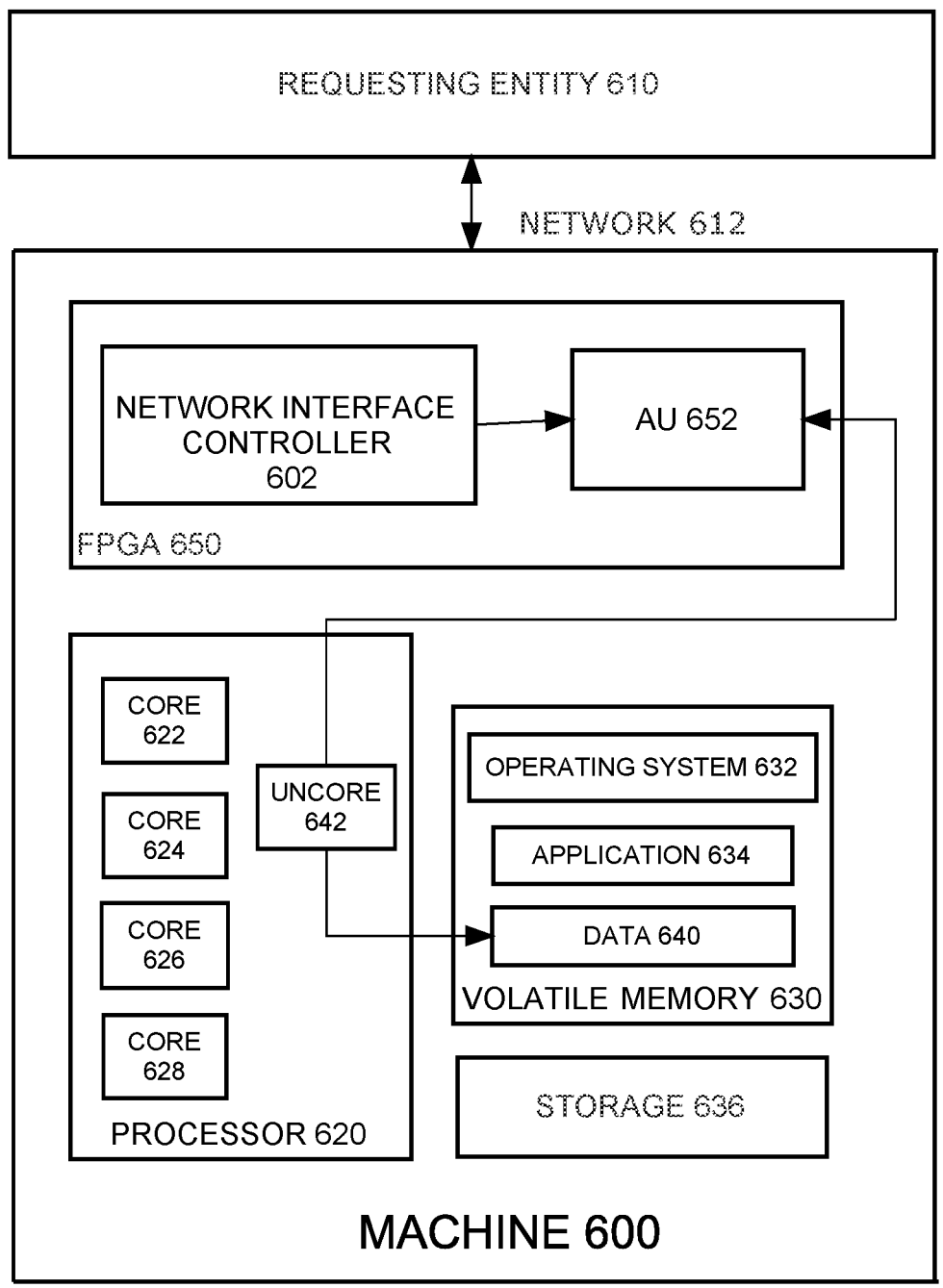
FIG. 6 is a block diagram of a system including a machine in which an FPGA serves as an execution candidate for locally and/or remotely initiated RDMOs.

FIG. 6 is a block diagram of a system that includes a machine 600 that may offload operations to a field programmable gate array (FPGA). Machine 600 includes a processor 620 that executes an operating system 632 and any number of applications, such as application 634. The code for the operating system 632 and application 634 may be stored on a persistent storage 636 and loaded into volatile memory 630 as needed. Processor 620 may be one of any number of processors within machine 600. Processor 620 may itself have many distinct compute units, shown as cores 622, 624, 622, and 628.

Machine 600 includes an FPGA 650 that has an accelerator unit AU 652. AU 652 has direct access to data 640 as the processor 620. Processor 620 includes circuitry (illustrated as uncore 642) that allows AU to access data 640 in the volatile memory 630 of machine 600 without involving cores 622, 624, 622, and 628 of processor 620.

Machine 600 includes a network interface controller NIC 102. NIC 102 may be coupled to FPGA 650 or may be integrated on FPGA 650.

For example, if an operation requested from the machine 600 itself is a relatively simple operation with high I/O and low computational requirements, it is possible that the operation may be performed more efficiently by AU 652 than by application 634 running on processor 620. Thus, it may be desirable to have AU 652 implemented on the FPGA 650 execute the relatively simple operation. Therefore, the application 634 running on processor 620 offloads the execution of the operation to AU 652. On the other hand, if the operation is a relatively complex operation with low I/O and high computational requirements, it may be more efficient for application 634 running on processor 620 to be used to execute the operation.

Handling Remotely-Initiated RDMOS Using an FPGA

The section above describes using an FPGA as the execution candidate to perform a locally-initiated RDMO. In a similar manner, an FPGA may be used as the execution candidate to perform a remotely-initiated RDMO. For example, assume that an external requesting entity 610 sends an RDMO request to NIC 602. If the RDMO is an operation supported ay AU 652, then it is possible that the operation may be performed more efficiently by AU 652 than by NIC 602 itself or an application 634 running on processor 620. Thus, NIC 602 will cause AU 652 implemented on the FGPA 650 to execute the RDMO. On the other hand, if the operation is a relatively complex operation with low I/O and high computational requirements, it may be more efficient for application 634 running on processor 620 to be used to execute the operation.

Support for new operations can be added by reprogramming the FPGA. Such reprogramming may be performed, for example, by loading the FPGA with a revised FPGA bitstream at powerup.

A Set of Common RDMOS to Accelerate OLTP and HTAP

Scaling out transaction processing is challenging if the workload is not amenable to partitioning. RDMA has recently generated substantial excitement in the research community as a mechanism to run multi-version concurrency control algorithms directly in remote memory. However, many simple manipulations cannot be performed in a single RDMA operation. For example, an update in a lock-based concurrency control requires at least three RDMA requests to lock (RDMA CAS), write (RDMA Write) and unlock (RDMA Write). An update in an MVCC (Multi-Version Concurrency Control) algorithm that uses immutable versions and wait-free readers would require a write to the new version (RDMA Write), a read to the old version (RDMA Read), and a compare-and-swap to atomically modify the visibility of the old version (RDMA CAS). In either case, a single write requires three inter-dependent RDMA operations to be performed sequentially. As a consequence, transactional performance is severely impacted by the latency of remote data access. A common set of RDMOs are described hereafter that perform predefined, short sequences of Read/Write/CAS operations in one network request to accelerate transactional performance.

The SlottedAppend RDMO

Many data structures in database systems, including disk pages, are split in variable-length slots which are accessed through indirection. The simplest form of such an indirection is an offset field that points to the first byte of the entry as a function of the location of the offset. The SlottedAppend RDMO safely manipulates such structures in a single network request. The pseudocode is as follows:

```
size_t SlottedAppend (void* location, size_t maxsize, const void*
buffer, size_t
length)
{
    size_t write_offset = atomic_fetch_add(location, length);
    if (write_offset > maxsize){
        atomic_fetch_add(location, -length);
        return maxsize;
    }
    memcpy (location + write_offset - length, buffer, length);
    return write_offset - length;
}
```

The SlottedAppend RDMO reads the value of the indirection entry at *location 110 (see FIG. 1), and it atomically increments it by the length of the buffer to be written. If the entire length of the buffer fits in maxsize bytes, the buffer is copied at the *old location 110a and the write location is returned. If writing the buffer would exceed the permissible size maxsize, the *location 100 is decremented and the special value maxsize is returned to signal a lack of space to complete the write.

SlottedAppend is designed to ameliorate write contention. It shrinks the conflict window and permits more concurrency under contention over an RDMA-only implementation. It cannot protect readers from reading incomplete or in-progress writes. In embodiments in which reader/writer isolation is desired, such isolation is enforced using other coordination mechanisms, such as locks or multi-versioning.

Usage example: One usage example for SlottedAppend in an OLTP workload is inserting one tuple 108 in a page 104, as shown in FIG. 1. The corresponding page 104 is first located in memory. Then SlottedAppend atomically increments the free pointer 102 using a fetch-and-add operation and writes the data to the slotted page 104 in one network operation.

The ConditionalGather RDMO

Traversing common data structures, including B-trees and hash tables, requires following pointers. Performing a sequence of such lookups over RDMA is inefficient as it requires selectively inspecting each element over RDMA. The ConditionalGather RDMO traverses pointer-based data structures and gathers elements matching a user-defined predicate in one buffer that is transmitted back in a single request.

```
template <typename T, typename COMP>
std::pair<int, void*> ConditionalGather (const T* location, int count, T
value,
const size_t length, void* gatherbuf, size_t gatherlen)
{
    int total = 0;
    location = *location;
    for (int l=0; (i < count) && (gatherlen >= length) && (location is
    RMDA-
accessible);        ++i){
        if (true == COMP (*location, value)){
            memcpy(gatherbuf, location, length);
            gatherbuf += length;
            gatherlen -= length;
            ++total;
        }
        location = *(location + offset);
    }
    return std::pair(total, gatherbuf);
}
```

The ConditionalGather RDMO collects the output at gatherbuf buffer 220 (See FIG. 2) and will use at most gatherlen bytes. ConditionalGather reads count elements starting at location 202. Each pointed element is compared with the parameter value 214 using the operator COMP 212 ∈ {<,≤,=,≥,>, ≠}. If the predicate 210 matches, ConditionalGather copies length bytes from the location of the comparison into the gatherbuf buffer 204. This is repeated until the gatherbuf buffer 220 is full or count entries have been processed. ConditionalGather returns the number of length-sized elements in the gatherbuf buffer 220.

There are two interesting variants of the ConditionalGather RDMO. The first variant accepts a local array instead and transmits it to the remote side, instead of accessing an indirection array in remote memory. This variant is useful when the locations are known in from prior RDMA operations or the gather operation retrieves at fixed offsets. (The latter corresponds to a strided access pattern.) The second variant does not require passing a fixed length parameter, but instead accepts a remote array with record lengths. This variant allows gathers on variable-length structures.

Figure 2:
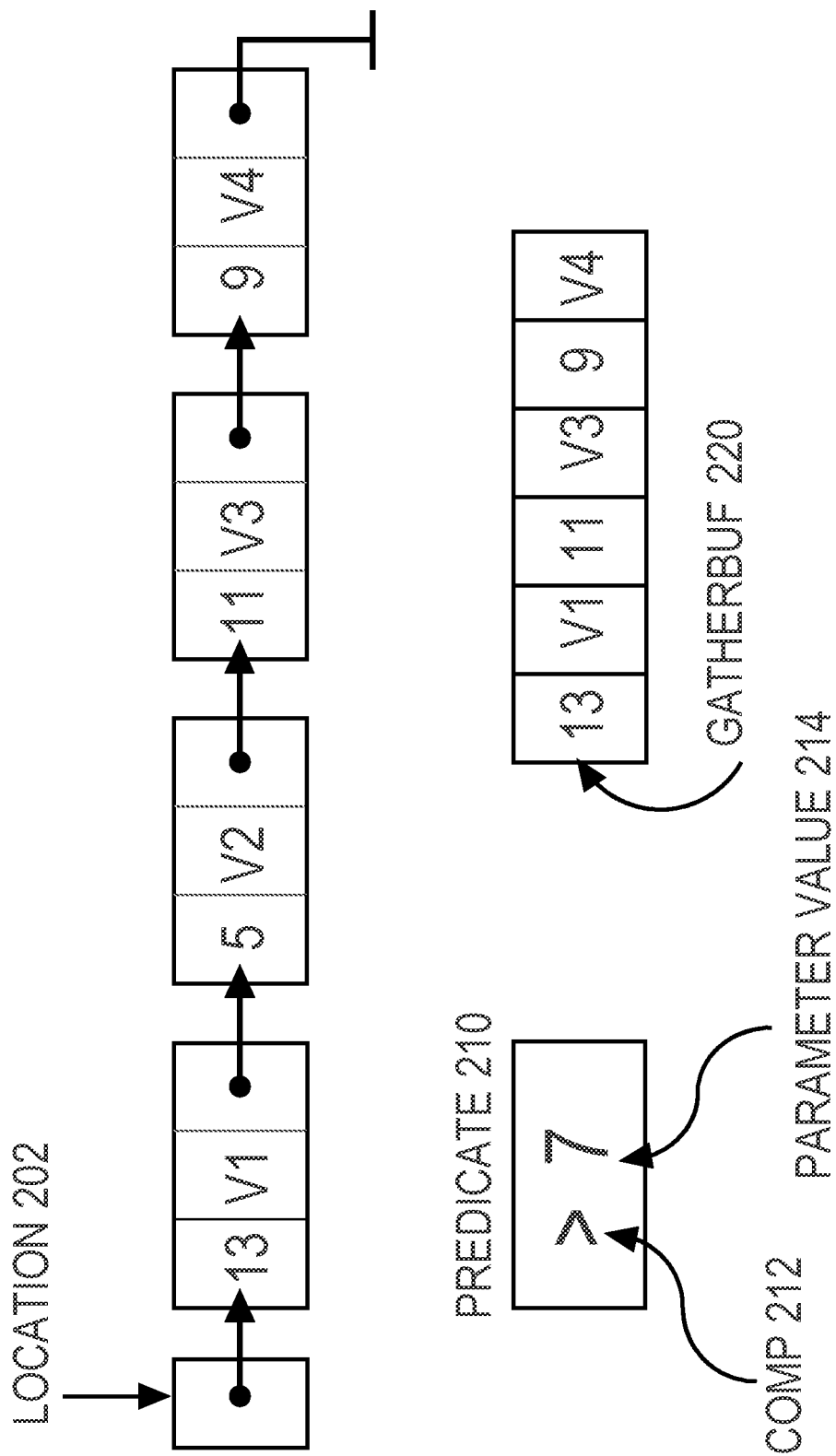
FIG. 2 is an example of ConditionalGather RDMO traversing a linked list of versions, performing a visibility check, and returning the matching tuples in one operation.

Usage example: Multi-version concurrency control can point snapshot transactions to older versions of records for higher concurrency. Identifying the appropriate record to read in a page requires determining version visibility. Performing this visibility check over RDMA operations is inefficient: Selectively inspecting each version over RDMA operations is too verbose and makes the entire operation latency-bound. The ConditionalGather RDMO can return visible versions as of some timestamp in one operation, as shown in FIG. 2. In an HTAP workload that involves a join, the ConditionalGather RDMO can retrieve all tuples in a hash bucket that match a key in one round-trip.

The SignaledRead RDMO

Many data structures have either no known lock-free alternatives or their lock-free alternatives impose severe constraints on the types of concurrent operations that are supported. These data structures commonly revert to lock-based synchronization. Exposing lock-based data structures over RDMA, however, requires at least three RDMA requests: two RDMA operations target the lock and at least one RDMA is needed to perform the intended operation. The SignaledRead RDMO can be used to "elide" the RDMA operations to the lock when reading in a lock-based data structure, akin to speculative lock elision in hardware. This avoids two round-trips to acquire and release the lock.

```
template <typename T>
std::pair<const T, void*> SignaledRead (const T* cas_location, T expectedval, T
desiredval, void* read_location, size_t length)
{
    T oldval = expectedval;
    bool cas_successful = false;
    for (int retries = 0; (false == cas_successful) && (retries < MAX_RETRIES);
    ++retries){
        cas_sucessful = atomic_compare_and_swap(cas_location,
            &oldval,
            desiredval);
    }
    if (true == cas_sucessful){
        if (length > 4){
            memcpy(rdma_response_buffer + 4, read_location + 4,
            length - 4);
            mfence( );
        }
        * (uint32 *) rmda_response_buffer = * (uint32*)
        read_location;
        * cas_location = expectedval;
        return std::pair(expectedval, rdma_response_buffer);
    }
    else
        return std::pair(oldval, NULL);
}
```

Figure 3:
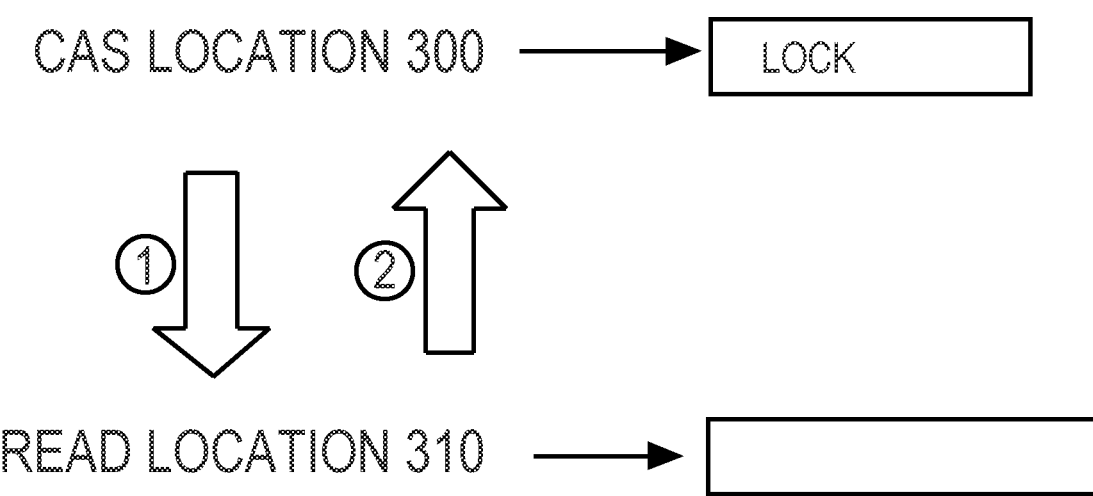
FIG. 3 is an example of SignaledRead RDMO eliding a lock when reading any lock-based data structure in one request.
Figure 4:
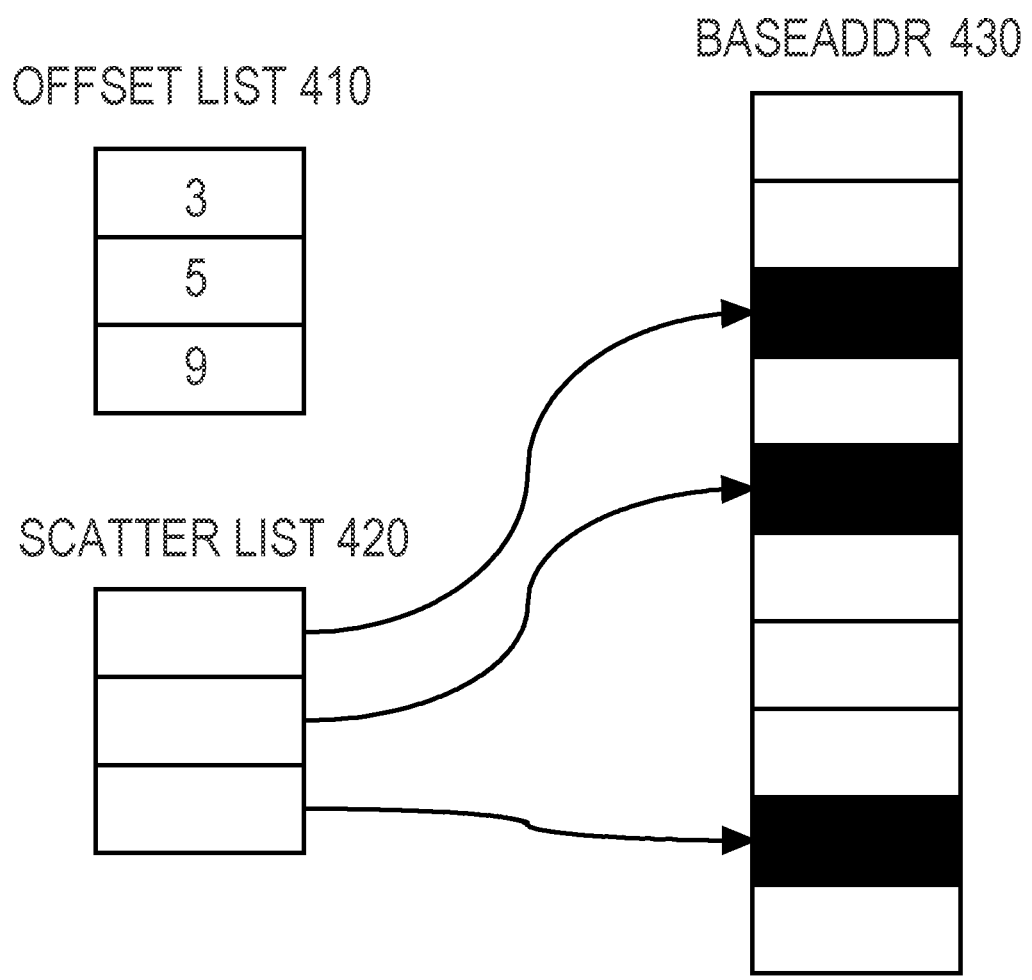
FIG. 4 is an example of ScatterAndAccumulate RDMO accumulating elements in the scatter list at user-defined offsets from the baseaddr pointer.

The SignaledRead RDMO attempts to perform a compare-and-swap operation on cas location 300 (See FIG. 3) and change the value from expectedval to desiredval. If the compare-and-swap operation fails, the RDMO retries the compare-and-swap for a few times and then returns the value of the last read. (The intent is to amortize the network latency of the round-trip over a few retries, in case of a spurious failure.) If the compare-and-swap succeeds, the SignaledRead RDMO reads length bytes at read location 310 and then resets cas location 300 to expectedval.

Note that the first four bytes of the read location 310 are copied last, after a memory fence from the previous memory copy. The intent is to allow the first four bytes to be used as a test whether the memory copy completed successfully in the case of a crash where the read location 310 points to non-volatile memory.

Usage example: The SignaledRead RDMO can be used to elide explicit RDMA operations to the lock when reading in a lock-based data structure. This greatly increases concurrency: avoiding two round-trips to acquire and release the lock means that the lock is held for a much shorter duration. Using SignaledRead guarantees that the read will be consistent as incoming updates will fail to acquire the lock.

THE WriteAndSeal RDMO

A variation of the SignaledRead is the WriteThenSeal RDMO. This RDMO can be used in lock-based synchronization to update and release the lock in one RDMA operation. If the seal location is in persistent memory, it is impossible to offer torn write protection as there is no atomicity or consistency guarantees for the sealing write. Using WriteThenSeal for durability will require an atomic and durable primitive for non-volatile memory, as discussed hereafter.

```
template <typename T>
void WriteAndSeal (void* write_location, const void* buffer, size_t
length, T*
seal_location, const T value)
{
    memcpy (write_location, buffer, length);
    mfence( );
    *seal_location = value;
}
```

The WriteAndSeal RDMO writes length bytes of data in a buffer at a write location, waits on a memory fence and then writes a value at a seal location. Note that the write location and seal location can overlap. The operation is guaranteed to be sequential but may not be atomic.

THE ScatterAndAccumulate RDMO

A common parallel operation is scatter, where a dense array of elements are copied into a sparse array. A more useful primitive for database systems is a scatter operation that involves indirect addressing to the destination, such as through a hash function or an index. In addition, database systems often desire to accumulate the values to what is already present in the destination, instead of overwrite the data. The ScatterAndAccumulate RDMO achieves this goal.

```
template <typename T, typename OP>
void ScatterAndAccmulate (T* baseaddr, T* scatter_list, size_t*
offset_list, int
count)
{
    for (int l = 0; l < count; ++i){
        void* loc = baseaddr + offset_list[i];
        *loc = OP(*loc, scatter_list[i]);
    }
}
```

The ScatterAndAccumulate RDMO accepts an array of elements scatter list 420 of length count. For each element, ScatterAndAccumulate accesses a base address baseaddr 430 and a user-defined offset in the offset list 410 array. It then accumulates the result of the operation OP ∈ {FETCHANDADD, SUM, MAX, MIN,COUNT} between the incoming data and the data already at the destination.

Usage example: In an HTAP workload, the ScatterAndAccumulate RDMO can accelerate a parallel hash-based aggregation: The sender performs local aggregation and then calculates the hash bucket destinations for each element. ScatterAndAccumulate then transmits the data and performs the aggregation to these buckets in one operation.

In addition, this RDMO can be used for min-hash sketching for set similarity estimation.

An RDMO-Capable OLTP Kernel

To best utilize these RDMOs during regular transaction processing activity, one may integrate RDMOs in the storage engine of the database system and directly expose in-memory storage structures, such as indexes, over RDMA. This design does not require extensive changes to the database system architecture, but it does not leverage RDMOs for transaction management module and concurrency control. Hence, an RDMO-aware storage engine will overcome inefficiencies at the physical data access level, such as optimizing or eliding latches (that is, short-term locks that protect critical segments that are a few instructions long).

Further efficiency gains can be achieved by integrating the RDMO functionality in the concurrency control protocol itself. This dovetails with recent research that couples concurrency control and storage for high performance in certain transaction processing systems. In one embodiment, RDMOs are used to verify the serializability of distributed transactions by directly accessing remote memory, instead of using the storage engine as the "intermediary" to access the shared state. In addition, this design choice allows us to interweave transaction management aspects (such as admission control, transaction restart and service level objectives) in the concurrency control protocol itself. The opportunity is to use RDMOs to bypass or accelerate synchronization at the logical level, such as synchronization for write anomalies or phantoms. This logical synchronization often requires locks that are held for the entire duration of the transaction.

Reliable Communication in a Data Center Over RDMA and RDMO

Current RDMA-based OLTP solutions ignore the possibility of data corruption. Yet, a single bit flip in NVRAM triggers a hardware error that (at best) breaks the RDMA connection or (at worst) crashes the entire database system. The transactional capabilities of a database system present an intriguing research opportunity: if one encapsulates data corruption within the transaction concept, database systems can handle data corruption more gracefully than general non-transactional applications by relying on existing abort/retry/log replay actions.

Key Management and Encryption

RDMA has been designed for trusted components within a data center to communicate efficiently. The RDMA protocol has a crude authentication mechanism in the form of 32-bit R keys and Q keys that validate that a remote sender has the right to access a local memory window and receive queue, respectively. However, the payload being transmitted over the network is not encrypted, as this would generally consume a lot of CPU resources on both sides. Furthermore, the RDMA message headers cannot be encrypted without making it impossible for the HCA to interpret those headers.

However, enterprises have growing concerns about malicious actors being able to intercept information at the physical network level of the data center. RDMA, in fact, exacerbates network security breaches: A malicious actor that intercepts the transmitted RDMA keys can forge valid RDMA requests to read or modify the entire memory window that is associated with this key. Furthermore, because RDMA bypasses the CPU at the destination, malicious network activity is oblivious to the OS and the receiving application, hence malicious network activity will not be reflected in the network statistics or audit logs on the target node.

In one embodiment, end-to-end encryption is provided for RDMA-connected applications. This includes reliably forming the connection and securely and privately transferring the data. Current facilities will be used for authentication. RDMA Queue Pairs are created after having created a properly-authenticated SSL connection between the participants and negotiating the protocol and network to use for RDMA. At some point in this negotiation, the applications either create secure Queue Pairs to be used only for communication between these two processes or get access to the appropriate Q key for access to an end point. Queue Pairs can be compromised by the Operating Systems that was used to create the Queue Pairs or by compromised applications holding valid Queue Pairs, R keys or Q keys.

An alternative approach is to use DTLS, which works within any application on top of an unreliable datagram protocol, but this interferes with HW acceleration. The goal is to investigate whether IPSec over RoCE can be modified to make new connections cheaper.

Data Corruption and NVRAM

Low-latency, high-volume NVRAM, such as Intel 3DXP, will be commercially available very soon. Future NVRAM will have much higher density than DRAM. However, one crucial prerequisite for enterprise deployment is memory media corruption. Furthermore, the probability of corruption per cache line may not be uniform, as NVRAM modules will be spread across memory channels and CPU sockets. It is thus an unavoidable outcome that some memory locations, whether due to wear out or firmware bugs, will introduce subtle data corruption or become inaccessible. This hardware error would be reported to the OS through the Machine-Check-Architecture (MCA) facility. MCA provides a mechanism to handle memory corruption instead of crashing the entire machine or propagating erroneous values.

Enabling RDMA access to NVRAM is an essential optimization in a converged datacenter architecture, as accessing remote memory through existing OS primitives would overshadow the DRAM-like speed of NVRAM. As low-latency NVRAM will be directly attached on the memory bus, this means that remote accesses from an HCA must be aware of hardware errors reported over MCA and check for memory poison bits. However, the current RDMA framework has no facility to detect, handle, and clear poison bits. One possibility is that the RDMA client will silently receive corrupted data. This can be mitigated through checksums (either in software or hardware). A more serious error, however, would be losing the entire RDMA connection, which would make the entire node unavailable just because of a single data corruption. Our solution consists of two approaches with different completion timelines.

In one embodiment, a pure software solution is used that only involves the network device driver and not any firmware or hardware changes. The mitigation mechanism couples an application-aware retry mechanism with a corruption detection facility.

When data corruption produces a machine-check exception (MCE), the exception in turn triggers a kernel panic. This manifests as a disconnect to the RDMA client. Embodiments may also include transparent software-level retry, which requires a higher level API for retriable data access, e.g., a key-value store API or a transactional interface for a DBMS.

It may also be the case that the node suppresses MCE and silently returns corrupted memory. In this case, a corruption detection mechanism based on checksums is used. This requires a higher-level API to maintain the checksums and retry the access. One embodiment involves hardware offload to the HCA.

An alternative embodiment involves hardware/software co-design. In particular, the stack is made aware of memory poison bits so that user mode applications can choose to handle memory corruption in the application. This requires changing the firmware and the driver of the network device, and also extend the standard RDMA verbs API with a callback registration mechanism for handling data corruption.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
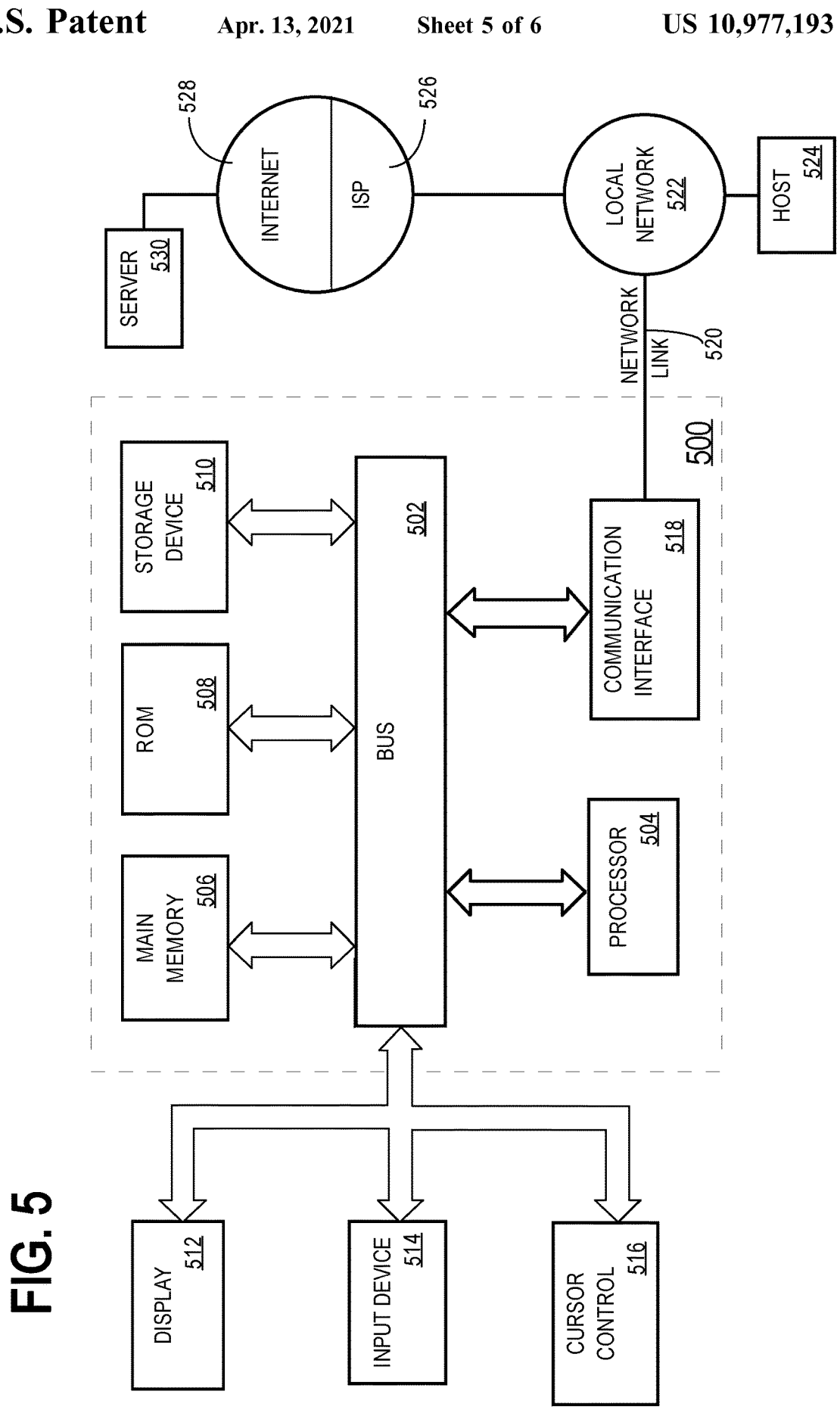
FIG. 5 is an example of a block diagram of a computer system upon which the techniques described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions. Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DBaaS provider manages or controls the underlying cloud infrastructure, applications, and servers, including one or more database servers.

Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   a process, executing on a first processor, causing a Remote Direct Memory Operation (RDMO) to be executed by an execution candidate that does not include the first processor;
   wherein the RDMO comprises a pre-defined sequence of two or more sub-operations;
   wherein each sub-operation, of the two or more sub-operations, is one of: a read operation, a write operation, or a compare-and-swap operation; and
   wherein causing the RDMO to be executed comprises causing the execution candidate to perform one of:
   (a) appending a write value to content of a disk page by:
       based, at least in part, on a location value for the content of the disk page, determining whether the disk page includes free space that is at least a size of the write value, and
       in response to determining that the disk page includes free space that is at least the size of the write value:
           appending the write value to an end of the content of the disk page, and
           atomically incrementing the location value by a length of the write value;
   (b) traversing one or more pointer-based data structures to identify elements, stored at the one or more pointer-based data structures, that satisfy a particular predicate by, for each pointer-based data structure of the one or more pointer-based data structures:
       determining whether a value stored at said each pointer-based data structure satisfies the particular predicate, and
       wherein determining whether a particular value stored at a particular pointer-based data structure satisfies the particular predicate comprises comparing, using a comparison operator, the particular value with a parameter value;
       wherein the comparison operator is one of: less than, less than or equal to, equal to, greater than or equal to, greater than, or is not equal to;
       in response to determining that the value stored at said each pointer-based data structure satisfies the particular predicate, including the value in a results buffer;
   (c) reading from a lock-based data structure, associated with a lock, the acquisition of which is required to perform an operation in the lock-based data structure, without performing operations on the lock for the lock-based data structure by:
  performing a compare-and-swap operation on a lock location for the lock,
  wherein, prior to performing the compare-and-swap operation, the lock location stores an original value,
  in response to determining success of said performing the compare-and-swap operation on the lock location:
    reading from the lock-based data structure, and
    after reading from the lock-based data structure, resetting the lock location to the original value;
(d) copying data to a write location by:
  copying data from a buffer to the write location, and
  after copying the data from the buffer to the write location, writing a second value at a seal location in memory; or
(e) performing an accumulation operation over one or more values stored at one or more respective addresses by, for each value of the one or more values:
  performing the accumulation operation between said each value and a corresponding value in a scatter list to produce an accumulation result value, and
  storing the accumulation result value at the address of said each value,
  wherein the accumulation operation is one of: FETCHANDADD, SUM, MAX, MIN, COUNT.

2. The method of claim 1 wherein causing an RDMO to be executed involves causing the execution candidate to perform appending a write value to content of a disk page.

3. The method of claim 1 wherein causing an RDMO to be executed involves causing the execution candidate to perform traversing one or more pointer-based data structures to identify elements, stored at the one or more pointer-based data structures, that satisfy a particular predicate.

4. The method of claim 1 wherein causing an RDMO to be executed involves causing the execution candidate to perform reading from a lock-based data structure.

5. The method of claim 1 wherein causing an RDMO to be executed involves causing the execution candidate to perform copying data to a write location.

6. The method of claim 1 wherein causing an RDMO to be executed involves causing the execution candidate to perform an accumulation operation over one or more values stored at one or more respective addresses.

7. The method of claim 1 wherein:
  the first processor is on a first computing device;
  the execution candidate is on a second computing device that is remote relative to the first computing device; and
  causing the RDMO to be executed by the execution candidate comprises sending the RDMO, to the second computing device, via a single network request.

8. The method of claim 1 wherein the first processor and the execution candidate are within a single computing device.

9. The method of claim 1 wherein the execution candidate is a field programmable gate array (FPGA) configured to perform the RDMO.

10. A system comprising:
  a first processor executing a process that causes a Remote Direct Memory Operation (RDMO) to be executed by an execution candidate that does not include the first processor;
  wherein the RDMO comprises a pre-defined sequence of two or more sub-operations;
  wherein each sub-operation, of the two or more sub-operations, is one of: a read operation, a write operation, or a compare-and-swap operation; and
  wherein causing the RDMO to be executed comprises causing the execution candidate to perform one of:
    (a) appending a write value to content of a disk page by:
      based, at least in part, on a location value for the content of the disk page, determining whether the disk page includes free space that is at least a size of the write value, and
      in response to determining that the disk page includes free space that is at least the size of the write value:
        appending the write value to an end of the content of the disk page, and
        atomically incrementing the location value by a length of the write value;
    (b) traversing one or more pointer-based data structures to identify elements, stored at the one or more pointer-based data structures, that satisfy a particular predicate by, for each pointer-based data structure of the one or more pointer-based data structures:
      determining whether a value stored at said each pointer-based data structure satisfies the particular predicate, and
      wherein determining whether a particular value stored at a particular pointer-based data structure satisfies the particular predicate comprises comparing, using a comparison operator, the particular value with a parameter value;
      wherein the comparison operator is one of: less than, less than or equal to, equal to, greater than or equal to, greater than, or is not equal to;
      in response to determining that the value stored at said each pointer-based data structure satisfies the particular predicate, including the value in a results buffer;
    (c) reading from a lock-based data structure, associated with a lock, the acquisition of which is required to perform an operation in the lock-based data structure, without performing operations on the lock for the lock-based data structure by:
      performing a compare-and-swap operation on a lock location for the lock,
      wherein, prior to performing the compare-and-swap operation, the lock location stores an original value,
      in response to determining success of said performing the compare-and-swap operation on the lock location:
        reading from the lock-based data structure, and
        after reading from the lock-based data structure, resetting the lock location to the original value;
    (d) copying data to a write location by:
      copying data from a buffer to the write location, and
      after copying the data from the buffer to the write location, writing a second value at a seal location in memory; or
    (e) performing an accumulation operation over one or more values stored at one or more respective addresses by, for each value of the one or more values:
      performing the accumulation operation between said each value and a corresponding value in a scatter list to produce an accumulation result value, and storing the accumulation result value at the address of said each value, wherein the accumulation operation is one of: FETCHANDADD, SUM, MAX, MIN, COUNT.

11. The system of claim 10 wherein causing an RDMO to be executed involves causing the execution candidate to perform appending a write value to content of a disk page.

12. The system of claim 10 wherein causing an RDMO to be executed involves causing the execution candidate to perform traversing one or more pointer-based data structures to identify elements, stored at the one or more pointer-based data structures, that satisfy a particular predicate.

13. The system of claim 10 wherein causing an RDMO to be executed involves causing the execution candidate to perform reading from a lock-based data structure.

14. The system of claim 10 wherein causing an RDMO to be executed involves causing the execution candidate to perform copying data to a write location.

15. The system of claim 10 wherein causing an RDMO to be executed involves causing the execution candidate to perform an accumulation operation over one or more values stored at one or more respective addresses.

16. The system of claim 10 wherein:

the first processor is on a first computing device;

the execution candidate is on a second computing device that is remote relative to the first computing device; and causing the RDMO to be executed by the execution candidate comprises sending the RDMO, to the second computing device, via a single network request.

17. The system of claim 10 wherein the first processor and the execution candidate are within a single computing device.

18. The system of claim 10 wherein the execution candidate is a field programmable gate array (FPGA) configured to perform the RDMO.

* * * * *